(12) United States Patent
Ruckle et al.

(10) Patent No.: US 10,827,662 B2
(45) Date of Patent: Nov. 10, 2020

(54) DISK BLADE WITH SHARPENED EDGE AND RELIEF PORTION AND METHOD OF MANUFACTURING THE SAME

(71) Applicant: DEERE & COMPANY, Moline, IL (US)

(72) Inventors: Jarrod R. Ruckle, Bondurant, IA (US); Shawn J. Becker, Centralia, KS (US); David L. Steinlage, Centralia, KS (US)

(73) Assignee: DEERE & COMPANY, Moline, IL (US)

( * ) Notice: Subject to any disclaimer, the term of this patent is extended or adjusted under 35 U.S.C. 154(b) by 376 days.

(21) Appl. No.: 15/945,837

(22) Filed: Apr. 5, 2018

(65) Prior Publication Data

US 2019/0307049 A1    Oct. 10, 2019

(51) Int. Cl.
*A01B 15/16*     (2006.01)
*A01B 15/18*     (2006.01)
(Continued)

(52) U.S. Cl.
CPC .............. *A01B 15/18* (2013.01); *A01B 15/16* (2013.01); *A01B 23/06* (2013.01); *B21D 22/02* (2013.01); *B23D 65/02* (2013.01); *B24B 3/466* (2013.01)

(58) Field of Classification Search
CPC ......... A01B 15/16; A01B 15/18; A01B 23/06; A01B 7/00; B21D 22/02; B23D 65/02; B24B 3/466
(Continued)

(56) References Cited

U.S. PATENT DOCUMENTS 2,908,338 A    10/1959  Hanrahan
3,213,514 A *  10/1965  Evans .................... A01B 23/06
                                                              29/14
(Continued)

FOREIGN PATENT DOCUMENTS

CA    2561846 A1    4/2008
CA    2698858 A1    9/2011
(Continued)

OTHER PUBLICATIONS

European Search Report for European Patent Application No. 19167641.0 dated Oct. 29, 2019 in 9 pages.
(Continued)

*Primary Examiner* — Robert E Pezzuto
(74) *Attorney, Agent, or Firm* — Taft Stettinius & Hollister LLP; Stephen F. Rost

(57) ABSTRACT

A method of manufacturing an agricultural tillage disk blade includes providing a substantially circular-shaped disk body with an outer peripheral edge and a central opening that defines a rotation axis, the outer body being disposed within a first plane. A plurality of waves is formed in a predetermined pattern in the outer peripheral edge of the disk body, and the outer peripheral edge is sharpened to form a plurality of teeth such that at least a portion of the sharpened outer peripheral edge is disposed within a second plane that is parallel to the first plane and substantially perpendicular to the rotation axis. The method also includes machining a plurality of relief portions in each of the plurality of waves at a location radially inward of the plurality of teeth, and heat treating the disk body after the sharpening and machining steps.

20 Claims, 6 Drawing Sheets

(51) Int. Cl.
   *B23D 65/02* (2006.01)
   *B21D 22/02* (2006.01)
   *A01B 23/06* (2006.01)
   *B24B 3/46* (2006.01)

(58) Field of Classification Search
   USPC ........ 111/140, 166, 191; 172/555, 560, 604, 172/747
   See application file for complete search history.

(56) References Cited

U.S. PATENT DOCUMENTS

| | | | |
|---|---|---|---|
| 4,098,349 | A | 7/1978 | Jilani |
| 4,099,576 | A | 7/1978 | Jilani |
| 4,538,688 | A | 9/1985 | Szucs et al. |
| 4,598,654 | A | 7/1986 | Robertson et al. |
| 5,097,727 | A | 3/1992 | Fischer et al. |
| 5,517,932 | A | 5/1996 | Ott et al. |
| 5,623,997 | A | 4/1997 | Rawson et al. |
| 5,649,602 | A | 7/1997 | Bruce |
| 5,855,246 | A | 1/1999 | Bruce |
| 6,279,666 | B1 | 8/2001 | Nikkel et al. |
| D467,944 | S | 12/2002 | Stark |
| 6,654,079 | B2 | 4/2003 | Bruce |
| 7,497,270 | B2 | 3/2009 | Bruce |
| 7,640,995 | B2 | 1/2010 | Knobloch |
| 7,874,376 | B2 | 1/2011 | Piccat |
| 7,878,262 | B1 | 2/2011 | Bruce |
| 7,905,968 | B2 | 3/2011 | Bruce |
| 7,992,651 | B2 | 8/2011 | Bruce |
| 8,100,194 | B2 | 1/2012 | Bruce |
| 8,365,837 | B2 | 2/2013 | Gray et al. |
| 9,027,664 | B2 | 5/2015 | Bruce |
| 9,204,688 | B2 | 12/2015 | Christie et al. |
| 9,392,137 | B2 | 7/2016 | Okado |
| 9,392,737 | B2 | 7/2016 | Sanderson |
| 9,545,046 | B1 | 1/2017 | Bruce et al. |
| 2011/0147018 | A1 | 6/2011 | Bruce |
| 2011/0240319 | A1 | 10/2011 | Sanderson |
| 2015/0289433 | A1* | 10/2015 | Sanderson ............. A01B 15/16 172/604 |

FOREIGN PATENT DOCUMENTS

| | | |
|---|---|---|
| CN | 2059787 U | 8/1990 |
| DE | 1297371 B | 6/1969 |
| DE | 1930228 A1 | 12/1970 |
| DE | 19858985 A1 | 6/2000 |
| EP | 2232970 A1 | 3/2010 |
| FR | 2679100 A1 | 1/1993 |
| FR | 2945179 A1 | 11/2010 |
| GB | 1190349 A | 5/1970 |
| GB | 2155294 B | 12/1986 |
| GB | 2437481 A | 10/2007 |
| WO | 1992017051 A1 | 10/1992 |
| WO | 1993018637 A1 | 9/1993 |
| WO | 2002019791 A1 | 3/2002 |
| WO | 2012079567 A3 | 8/2012 |
| WO | 2015010184 | 1/2015 |

OTHER PUBLICATIONS

Kuhn Krause Vertical Tillage Excelerator 8005 brochure, pp. 1-8; published Aug. 20, 2016.

* cited by examiner

DISK BLADE WITH SHARPENED EDGE AND RELIEF PORTION AND METHOD OF MANUFACTURING THE SAME

FIELD OF THE DISCLOSURE

The present disclosure relates to a tillage disk blade for use on a tillage implement, and in particular, a tillage disk blade having a sharpened edge with a machined relief portion and method of manufacturing the same.

BACKGROUND

Conventional agricultural tillage implements often include one or more coulters. The coulters may be designed with flutes or waves, varying degrees of concavity, and various cutting edges. Conventional coulters are designed for penetrating into a ground surface to perform a tillage operation. These coulters may have a uniform cutting edge about its circumference, or other coulters may include a plurality of cutting teeth.

A conventional coulter may be manufactured via a stamping process to form the shape of the blade, and then a subsequent grinding process for forming or shaping the cutting edge. Conventional coulters, however, are found to wear quickly at the cutting edge and lack the ability to penetrate easily into the ground to a desired depth. This becomes more problematic as the cutting edge wears. Moreover, the durability of these coulters can be particularly limiting, such that a used coulter is either repaired or replaced frequently. This leads to down time of the agricultural machine and tillage process.

Thus, there is a need for a coulter or tillage disk blade with improved wear and penetration characteristics and which is more durable than conventional coulters.

SUMMARY

In one embodiment of the present disclosure, a method of manufacturing an agricultural tillage disk blade includes providing a substantially circular-shaped disk body with an outer peripheral edge and a central opening, the central opening defining a rotation axis and the body disposed within a first plane; forming a plurality of waves in a predetermined pattern in the outer peripheral edge of the disk body; sharpening the outer peripheral edge to form a plurality of teeth about an outer circumference of the disk body such that at least a portion of the sharpened outer peripheral edge is disposed within a second plane that is parallel to the first plane and substantially perpendicular to the rotation axis; machining a plurality of relief portions in each of the plurality of waves at a location radially inward of the plurality of teeth; and heat treating the disk body after the sharpening and machining steps.

In one example of this embodiment, the method may include heat treating the disk body after the forming step and before the sharpening step. In a second example, the forming step includes placing the disk body inbetween a pair of dies and stamping the plurality of waves in the outer peripheral edge. In a third example, the forming step may include forming the disk body to a concave side and a convex side. In a fourth example, the sharpening and machining steps are executed only on the concave side of the disk body.

In another example of this embodiment, the method may include forming a plurality of notches in the outer peripheral edge of the disk body. In yet another example, the forming step includes forming the outer peripheral edge such that the plurality of waves is symmetrically formed in the disk body; and the sharpening step includes machining the outer peripheral edge such that the plurality of teeth are symmetrically formed in the disk body. In a further embodiment, the machining step comprises removing a portion of a peak of each wave in the outer peripheral edge to form each of the plurality of relief portions. In yet a further embodiment, the machining step comprises forming the plurality of relief portions at an angle of less than 20° relative to the first plane.

In another embodiment of this disclosure, an agricultural tillage disk blade for use in a tillage operation includes a disk body including an outer peripheral portion and a central opening for defining a rotation axis of the disk blade, the outer peripheral portion being disposed in a first plane perpendicular to the rotation axis; a plurality of waves formed in a predefined pattern in the outer peripheral portion of the disk body; a sharpened cutting edge defined in the outer peripheral portion of the disk blade; and a plurality of relief portions machined in the outer peripheral portion of the disk blade, each of the plurality of relief portions being machined in each of the plurality of waves of the disk body at a location radially inward of the sharpened cutting edge.

In one example of this embodiment, the sharpened cutting edge is disposed within a second plane, the second plane being parallel to the first plane and perpendicular to the rotation axis. In a second example, a plurality of teeth and a plurality of notches are formed in the sharpened cutting edge of the disk blade, each of the plurality of notches formed inbetween at least two of the plurality of teeth. In a third example, the plurality of waves and the plurality of teeth are symmetrically formed in the outer peripheral portion. In a fourth example, each of the plurality of relief portions is machined into a peak of one of the plurality of waves at a location radially inward of one of the plurality of notches; and each of the plurality of relief portions is machined at an angle relative to the first plane.

In another example of this embodiment, the disk body comprises a concave side and a convex side, the sharpened cutting edge and plurality of relief portions being formed on only the concave side. In a further example, the outer peripheral portion comprises a machined portion and a stamped portion, the plurality of waves being disposed in the stamped portion and the sharpened cutting edge and plurality of relief portions being disposed in the machined portion. In yet a further example, each of the plurality of relief portions includes a first machined edge, a second machined edge, and a third machined edge, the first machined edge being substantially straight and disposed nearest the sharpened cutting edge, and the second and third machined edges being partially curved at a location at which the two edges converge.

In a further embodiment of the present disclosure, a tillage disk blade for use in a tillage operation includes a disk body including an outer peripheral edge and an opening defined in a central portion of the body through which a rotation axis passes, the body being disposed in a first plane which is perpendicular to the rotation axis; a plurality of waves formed in a predefined pattern in the outer peripheral edge of the disk body; a plurality of teeth defined in the outer peripheral edge, where each of the plurality of teeth comprises a sharpened edge substantially disposed within a second plane, the second plane being parallel to the first plane and perpendicular to the rotation axis; and a plurality of relief portions formed in the plurality of waves of the disk body, wherein each of the plurality of relief portions is located radially inward of the plurality of teeth.

In one example of this embodiment, the plurality of waves and the plurality of teeth are symmetrically formed in the outer peripheral edge. In an alternative example, the disk blade may include a plurality of notches formed in the outer peripheral edge of the disk blade, each of the plurality of notches formed inbetween at least two of the plurality of teeth; wherein each of the plurality of relief portions is disposed radially inward of one of the plurality of notches; and wherein each of the plurality of relief portions is machined at an angle relative to the first plane.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION

Figure 1:
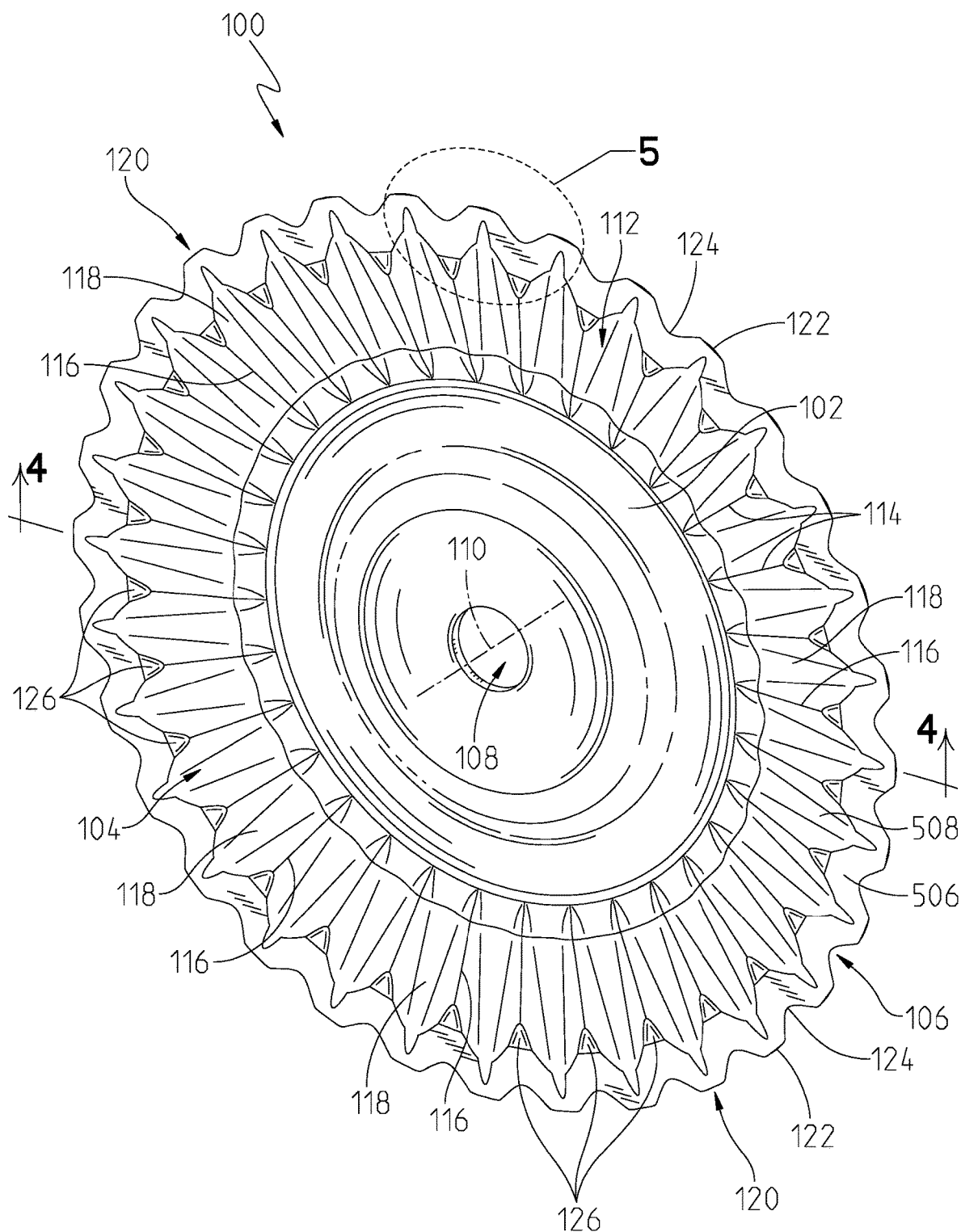
FIG. 1 is a perspective view of a tillage disk blade.

Referring to FIG. 1, one embodiment of the present disclosure of an agricultural tillage disk blade 100 is shown. Here, the disk blade 100 may be formed of a sheet of metal that is formed into its substantially circular shape as shown. The process of manufacturing the blade, and blades similar to the one shown in FIG. 1, is described in detail below and with reference to FIG. 6.

The blade 100 may include a disk body 102 that has a first side 104 and a second side 106. The first side 104 may be a concave side of the blade 100, which is shown in further detail in FIG. 2. The second side 106 may be a convex side of the blade 100, which is shown further in FIG. 3. The disk body 102 may further define an opening 108 near a center thereof. The opening 108 may have any desired diameter for allowing the disk 100 to be installed on an agricultural tillage implement (not shown). A rotation axis 110 is defined through the opening 108, such that when the disk 100 is installed, it may rotate about the rotation axis 110.

As also shown in FIG. 1, the disk blade 100 may include a wavy portion 112 defined at a location radially outward of the central opening 108. This wavy portion 112 may include a plurality of waves 114 that are formed circumferentially about the disk body 102. The waves 114 may form a plurality of peaks or ridges 116 and a plurality of valleys 118. The waves 114 are symmetrically formed about the circumference of the blade 100 such that each wave has the approximately the same height, e.g., peak 116, and same depth, i.e., valley 118. As shown, a valley 118 is formed inbetween adjacent peaks 116, and a peak 116 is formed between adjacent valleys 118.

In at least one embodiment, the waves 114 may reach their peak height at a location radially outward near a peripheral cutting edge 120 of the blade. In any event, the waves 114 are symmetrically formed in the disk body 102.

The peripheral cutting edge 120 of the disk blade 100 may be formed with a plurality of cutting teeth 122 and a plurality of notches 124. Each notch 124 may be formed inbetween adjacent teeth 122. The plurality of teeth 122 may engage a ground surface during a tillage operation before the rest of the blade 100.

Figure 5:
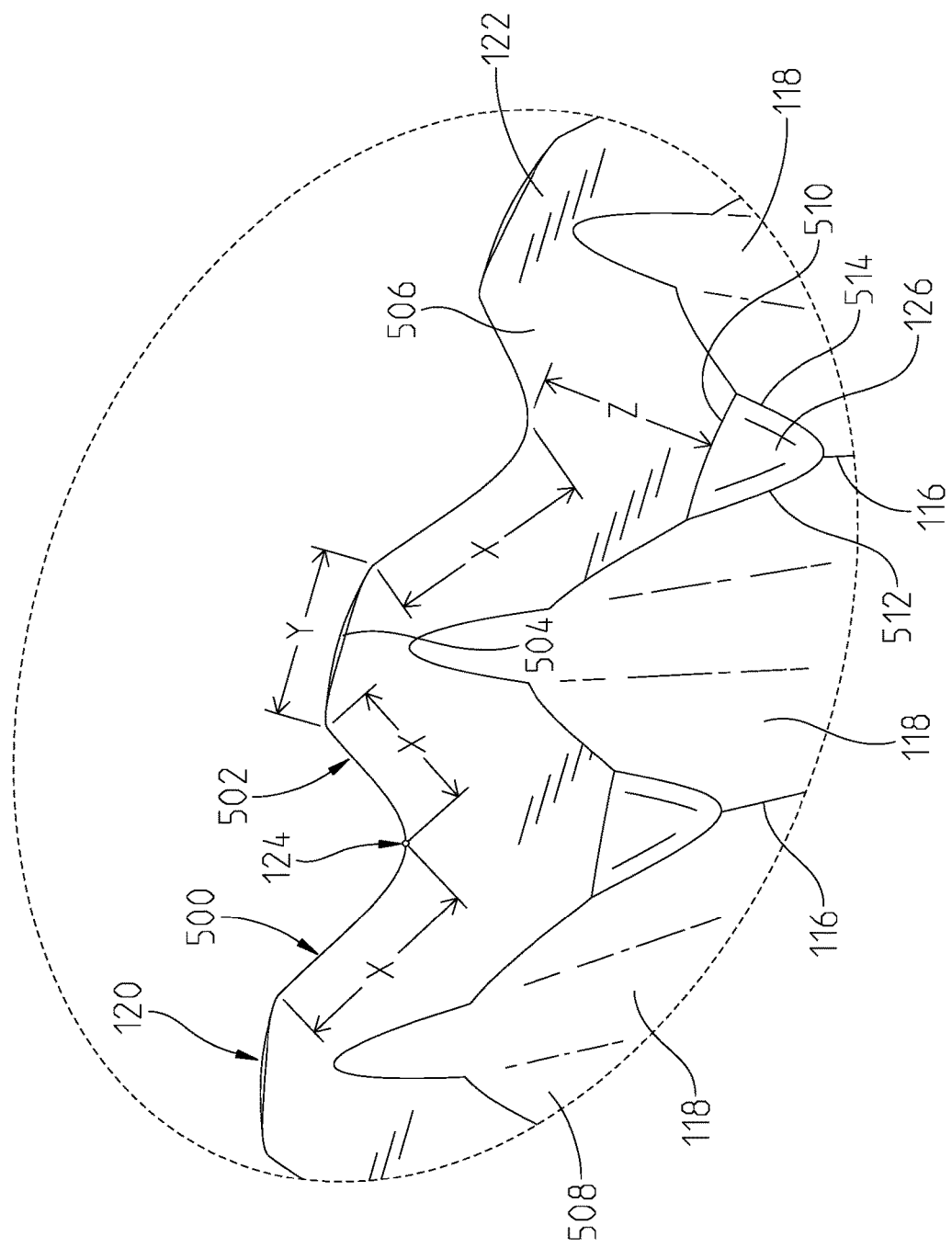
FIG. 5 is an enlarged view of a cutting edge of the disk blade of FIG. 1.

Referring to FIG. 5, an enlarged view of the peripheral cutting edge 120 is shown. Here, it is illustrated how each notch 124 may be formed between adjacent teeth 122. Each tooth 122 may be formed or defined by a first cutting edge 500 and a second cutting edge 502. Each of the two cutting edges protrude radially outward and integrally converge at opposite ends of a tooth edge 504. The tooth edge 504 is the most radially outward edge or surface of the tooth 122, and thus the disk blade 100. As shown, the tooth edge 504 may be formed as a substantially straight edge, although in other embodiments, the shape may have a partial curvature to it.

The shape of each tooth may be symmetrical such that the first cutting edge 500 and the second cutting edge 502 have a length, x. With tolerances, the lengths of each cutting edge may be different but within a tolerance range. Moreover, the tooth edge 504 may have a length, y. In one non-limiting example, the length, y, may be different from the length, x. In another example, the length, y, and length, x, are approximately the same.

Each of the plurality of notches 124 may be formed substantially arc-shaped, where the first and second cutting edges may converge at a point along the arc. This is shown in FIG. 5.

In FIG. 5, the disk blade 100 is further shown with a machined portion 506 and a stamped portion 508. The manufacturing process of forming these two portions of the disk blade 100 will be described below. In any event, the peripheral cutting edge 120 may be formed as part of the machined portion 506, whereas the waves 114 are formed as part of the stamped portion 508.

Figure 2:
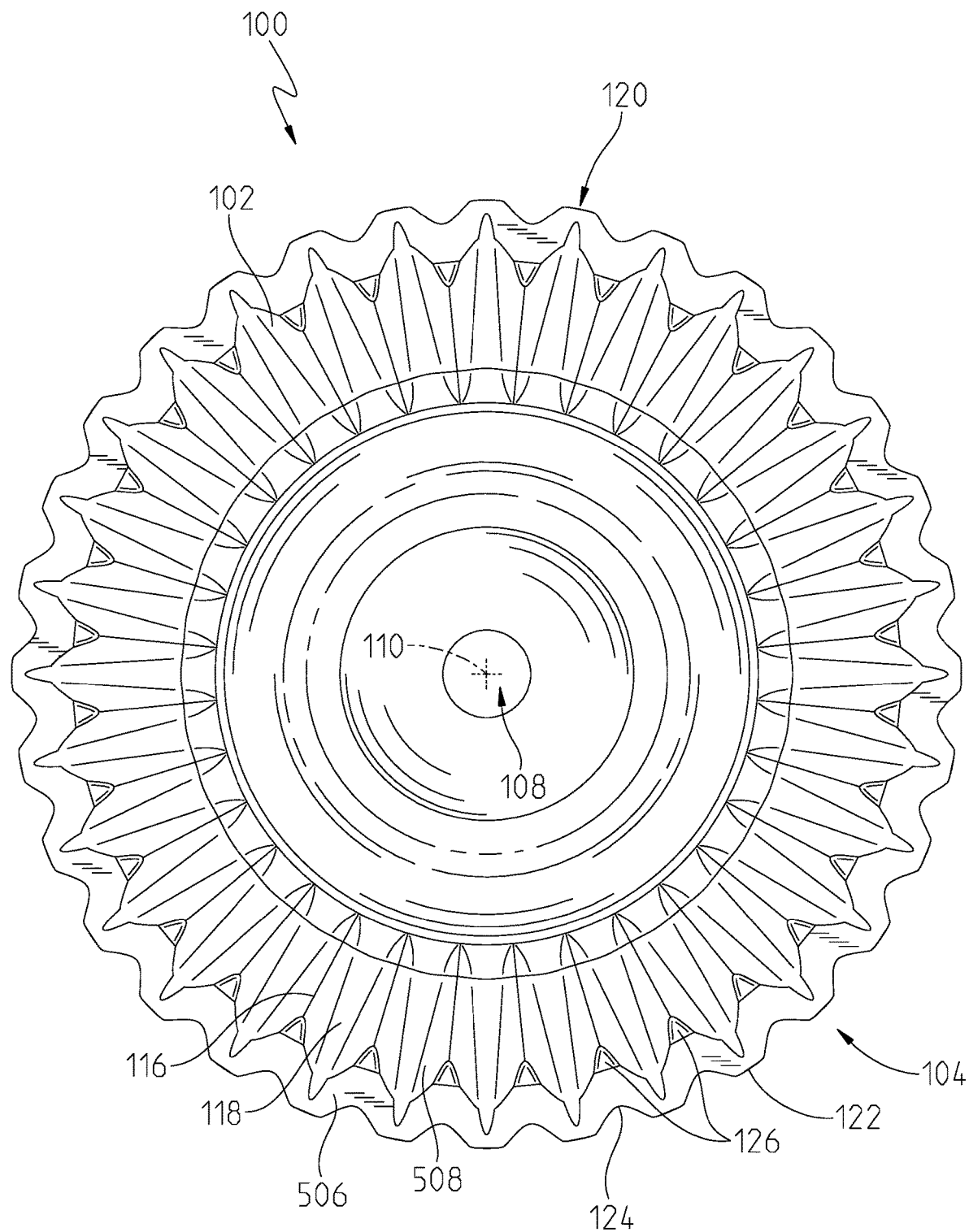
FIG. 2 is a planar view of a concave side of the blade of FIG. 1.
Figure 3:
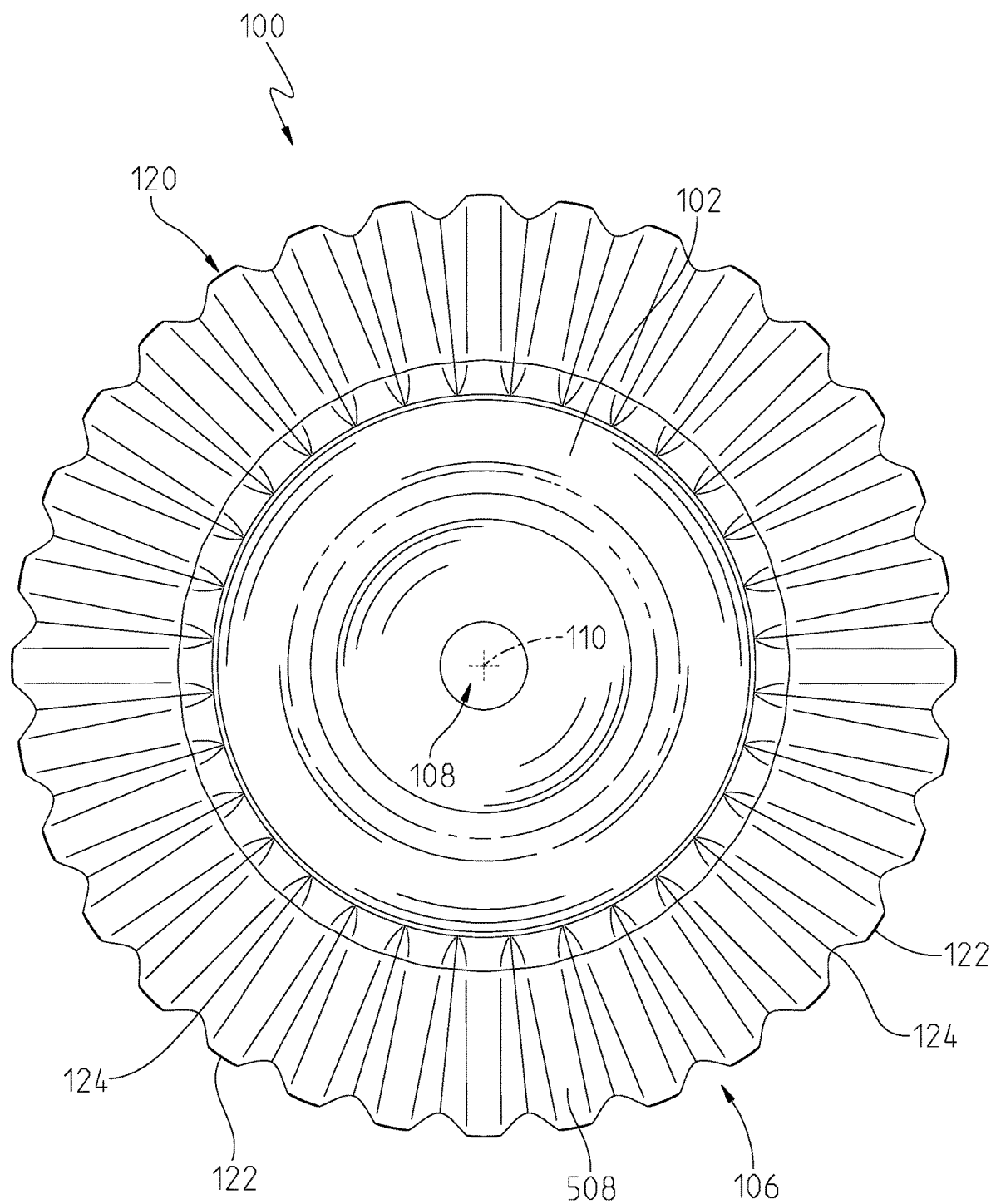
FIG. 3 is a planar view of a convex side of the blade of FIG. 1.

It is further illustrated in FIGS. 1 and 2 that the peripheral cutting edge 120, each tooth 122 and each notch 124 is formed as part of machined portion 506 of the disk blade 100. As shown in FIG. 3, however, it is illustrated that there is no machined portion 506 on the convex side 106 of the disk blade 100. Thus, and as will be described further below, the machined portion 506 may only be executed on the concave side 104 of the disk blade 100.

Figure 4:
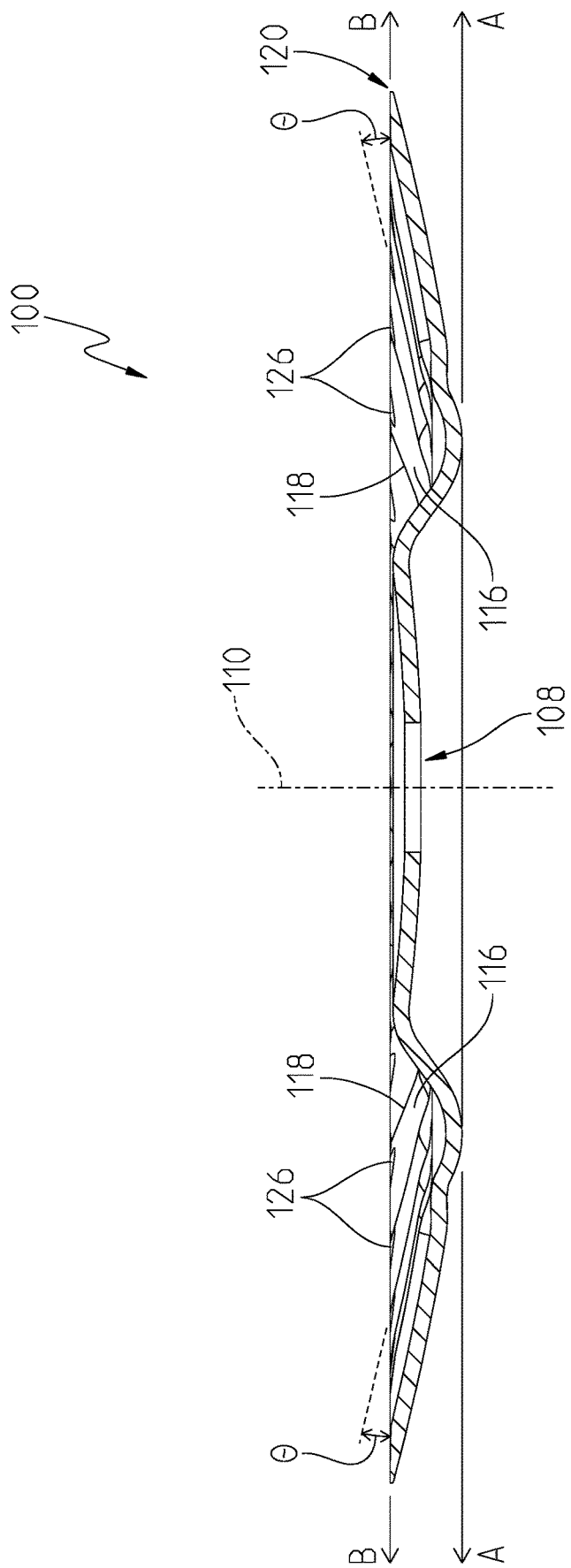
FIG. 4 is a side cross-sectional view of the disk blade along line 4-4 of FIG. 1.

Referring to FIG. 4 of the present disclosure, a cross-sectional view of the disk blade 100 is shown so that the shape of the blade is further illustrated. As shown, the disk blade 100 may define a first plane A-A. The outer periphery of the blade 100 may pass through this first plane. Moreover, this first plane A-A is defined substantially perpendicular to the rotation axis 110 of the disk blade 100. The cutting edge 120, which includes the teeth 122 having sharpened edges, may lie in a second plane B-B. The second plane, B-B, may be substantially parallel to the first plane, A-A, and substantially perpendicular to the rotation axis 110 of the blade 100. Further, the sharpened edges of each tooth (which includes primarily the tooth edge 504 and at least a portion of each individual tooth 122) lies within the second plane B-B. Stated another way, each tooth is formed at approximately 0° relative to the first plane A-A and second plane B-B, or approximately 90° relative to the rotation axis 110.

Referring now to FIGS. 1, 2, 4 and 5, the disk blade 100 may also be manufactured with a plurality of relief portions 126 machined or grinded into a portion of each peak or ridge 116 of the waves 114. These relief portions 126 may be machined or grinded as a secondary procedure during the manufacturing process. As shown in FIG. 5, each relief portion 126 is formed as part of the peak or ridge 116 of the waves 114, and thus is the only portion of the otherwise stamped portion 508 of the blade 100 that is machined.

The relief portion 126 may have a shape similar to that of FIG. 5. Here, the relief portion 126 may be defined by a first edge 510, a second edge 512, and a third edge 514. The first edge 510 is the most radially edge of the relief portion 126 from the rotation axis 110, and thus it is the closest to the cutting edge 120. As shown, the first edge 510 may be substantially straight and spaced by a distance z from the notch 124. It is noteworthy that the relief portion 126 is formed at a distance closer to a corresponding notch 124 than to a tooth edge 504 of a corresponding tooth 122.

The second edge 512 and third edge 514 may converge toward one another as shown in FIG. 5. At the point of conversion, the two edges may form a U-shape or V-shape. In FIG. 5, the convergence of both edges forms a U-shape. This, however, is not intended to be limiting, as the overall shape of the peak 118 and corresponding wave 114 may affect the size and shape of the relief portion 126. Moreover, while the illustrated relief portions in FIG. 5 are triangularly-shaped, this too is not meant to be limiting. In other embodiments, the shape of the relief portions 126 may be rectangular, square, circular, oval, etc.

Referring to FIG. 4, the relief portions 126 may be formed at an angle θ relative to the second plane B-B. In one non-limiting embodiment, angle θ may be less than 20°. In another embodiment, the angle θ may be less than 10°. In a further embodiment, the angle θ may between 5-10°. In a further embodiment, the angle θ may be approximately 8°.

In the disk blade 100 of FIG. 1, there can be any number of relief portions 126. For example, there may be a relief portion 126 formed in every peak 118 along the circumference of the blade 100. As a result, the number of relief portions 126 may depend upon the number of waves formed in the blade. Thus, there is no certain number of relief portions for any given blade.

The relief portions 126 offer several benefits to the performance of the disk blade 100 during a tillage operation. For example, the disk blade 100 has been found to penetrate the underlying ground surface more easily. Additional benefits include better wear of the blade 100, particularly in the area of the cutting edge 120. As the blade 100 wears, the overall shape of the cutting edge 120 with the defined teeth 122 and notches 124 last longer due to the relief portions 126. In general, tillage blades may last until their diameter wears to approximately 90% of its original diameter. Often, the teeth wear quicker than the rest of the blade, and as a result, the shape of the blade can become more circular with smaller teeth.

Due to the relief portions 126, the overall thickness of the blade 100 may be reduced in the areas near the notches 124. As such, due to normal wear, the rate at which the notches wear is similar to the rate at which the teeth wear.

In addition, testing of the disk blade without the relief portions being machined found that these areas of the peaks 118 were subject to high pressure or forces during the tillage operation. With the relief portions 126 machined into the disk blade 100, however, it has been found that the disk blade 100 now penetrates into the ground more easily, and particularly at higher gang angles (e.g., at gang angles greater than 5°).

A further benefit of the inclusion of the relief portions 126 has been improved durability of the disk blade. Through field and lab testing of the disk blade with and without the relief portions 126, it has been found that disk blades 100 with the relief portions 126 improved by 6% in durability over similar blades without the relief portions 126. Thus, the relief portions 126 have been found to improve the operation, wear and overall durability of the disk blade as compared to conventional blades or similar blades without the relief portions.

Figure 6:
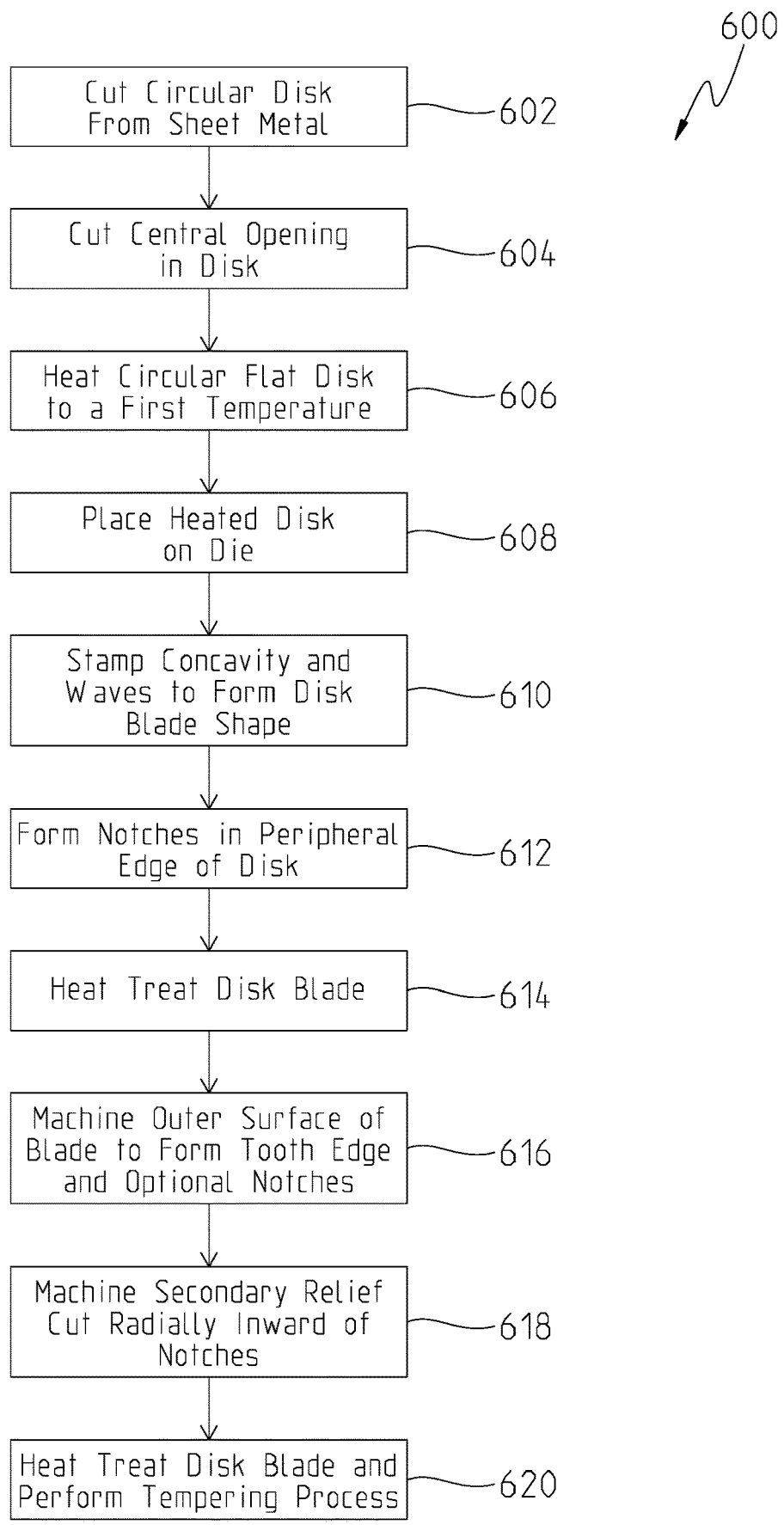
FIG. 6 is a flow diagram of a process for manufacturing the disk blade of FIG. 1.

Referring to FIG. 6, one embodiment of a manufacturing process 600 for manufacturing the disk blade 100 of FIG. 1 is provided. The process 600 includes one or more blocks or steps to be executed for manufacturing the blade. Although the blocks or steps are presented in a certain order, this is not intended to be limiting. In other embodiments, the blocks or steps may be executed in a different order. Alternatively, one or more of the blocks or steps shown in FIG. 6 may be omitted. Moreover, in yet another embodiment, there may be additional blocks or steps performed than those shown in FIG. 6 for manufacturing the disk blade.

The manufacturing process 600 of FIG. 6 may begin with a sheet of metal provided in the form of a coil or individual, rectangular sheets. In any event, in block 602, a circular disk may be cut from the sheet metal. This cutting, or blanking, step provides the circular shape of the disk. At the same time or after block 602, the opening 108 may be cut into the circular disk in block 604. The cutting process of blocks 602 and 604 may be performed via a stamping process. For instance, a pair of stamping dies may be used to stamp out the shape of the disk blade. Other known techniques may be employed, however, for cutting the circular disk from the sheet metal and forming the central opening 108.

Once the disk is cut from the sheet metal in blocks 602 and 604, the process 600 may advance to block 606 where the disk is heated to a desired or first temperature. By heating the disk, it becomes more malleable as the disk is placed on a stamping die in block 608. With the heated disk on the stamping die, a concavity and plurality of waves may be formed in the disk via a stamping process in block 610. In the stamping process, a pair of dies with the desired undulations or waves and concavity may be provided to achieve the desired shape of the disk blade. The aforementioned stamped portion 508 of the disk blade 100 may be formed via the stamping process in block 610.

The process 600 may optionally include block 612, where the plurality of notches 124 are formed in the disk blade via the stamping process. Whether the notches 124 are formed in block 612 or not, the stamped disk blade is next taken for a first heat treatment in block 614. This metallurgical heat treat step allows the disk blade to be heated to a certain temperature and then cooled in a desired manner to obtain structural integrity and other physical and mechanical properties including hardness and the like.

Once the disk is heat treated in block 614, the outer periphery and cutting edge 120 may be machined via a milling process. In an alternative embodiment, a grinding wheel may be used to form the plurality of teeth 122 and sharpened edges. In this block, the disk may be placed in a fixture so that it is lying flat and a mill may be used to form the machined portion 506 of the blade. In particular, the sharpened edge of the cutting portion 120 may be machined so that it lies in the second plane B-B, which again is parallel to the first plane A-A and substantially perpendicular to the rotation axis 110. Moreover, in the event block 612 was not performed, the machining in block 616 may also include forming the plurality of notches 124.

As described above, the concave or first side 104 of the disk blade 100 is subject to both the stamping process of block 610 and the machining process of block 616. The convex or second side 106 of the blade is only subject to the stamping process of block 610.

Once the parallel cutting edge 120 is formed in block 616, the manufacturing process 600 may advance to block 618 where a second machining operation is executed. Here, the mill, grinding wheel, or other cutting tool may be used to machine the relief portions 126 into each peak 116 on the concave side of the blade. In this block, the material removed from each peak 116 is done at a location radially inward from a respective notch 124. This is shown best in FIG. 5 and described above. Each relief portion 126 may be machined or cut at a desired angle relative to the first and second planes.

Upon completion of the second machining operation in block 618, the disk blade may be subject to a second heat treat operation in block 620. In block 620, the disk blade undergoes tempering to achieve the desired hardness, strength and toughness qualities to withstand the rigors of a tillage operation.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method of manufacturing an agricultural tillage disk blade, comprising:
providing a substantially circular-shaped disk body with an outer peripheral edge and a central opening, the central opening defining a rotation axis and the body disposed within a first plane;
forming a plurality of waves in a predetermined pattern in the outer peripheral edge of the disk body;
sharpening the outer peripheral edge to form a plurality of teeth about an outer circumference of the disk body such that at least a portion of the sharpened outer peripheral edge is disposed within a second plane that is parallel to the first plane and substantially perpendicular to the rotation axis;
machining a plurality of relief portions in each of the plurality of waves at a location radially outward on the plurality of waves and radially inward of the plurality of teeth such that no portion of the plurality of relief portions extends to the outer peripheral edge; and
heat treating the disk body after the sharpening and machining steps.

2. The method of claim 1, further comprising heat treating the disk body after the forming step and before the sharpening step.

3. The method of claim 1, wherein the forming step comprises placing the disk body inbetween a pair of dies and stamping the plurality of waves in the outer peripheral edge.

4. The method of claim 1, wherein the forming step further comprises forming the disk body to a concave side and a convex side.

5. The method of claim 4, wherein the sharpening and machining steps are executed only on the concave side of the disk body.

6. The method of claim 1, further comprising forming a plurality of notches in the outer peripheral edge of the disk body.

7. The method of claim 1, wherein:
the forming step comprises forming the outer peripheral edge such that the plurality of waves is symmetrically formed in the disk body; and
the sharpening step comprises machining the outer peripheral edge such that the plurality of teeth are symmetrically formed in the disk body.

8. The method of claim 1, wherein the machining step comprises removing a portion of a peak of each wave in the outer peripheral edge to form each of the plurality of relief portions.

9. The method of claim 1, wherein the machining step comprises forming the plurality of relief portions at an angle of less than 20° relative to the first plane.

10. An agricultural tillage disk blade for use in a tillage operation, comprising:
a disk body including an outer peripheral portion and a central opening for defining a rotation axis of the disk blade, the disk body being disposed in a first plane perpendicular to the rotation axis;
a plurality of waves formed in a predefined pattern in the outer peripheral portion of the disk body;
a sharpened cutting edge defined in the outer peripheral portion of the disk blade; and
a plurality of relief portions machined in the outer peripheral portion of the disk blade, each of the plurality of relief portions being machined in each of the plurality of waves of the disk body at a location radially outward on the plurality of waves and radially inward of the sharpened cutting edge such that no portion of the plurality of relief portions extends to the sharpened cutting edge.

11. The disk blade of claim 10, wherein the sharpened cutting edge is disposed within a second plane, the second plane being parallel to the first plane and perpendicular to the rotation axis.

12. The disk blade of claim 10, further comprising a plurality of teeth and a plurality of notches formed in the sharpened cutting edge of the disk blade, each of the plurality of notches formed inbetween at least two of the plurality of teeth.

13. The disk blade of claim 12, wherein the plurality of waves and the plurality of teeth are symmetrically formed in the outer peripheral portion.

14. The disk blade of claim 12, wherein:
each of the plurality of relief portions is machined into a peak of one of the plurality of waves at a location radially inward of one of the plurality of notches; and
each of the plurality of relief portions is machined at an angle relative to the first plane.

15. The disk blade of claim 10, wherein the disk body comprises a concave side and a convex side, the sharpened cutting edge and plurality of relief portions being formed on only the concave side.

16. The disk blade of claim 10, wherein the outer peripheral portion comprises a machined portion and a stamped portion, the plurality of waves being disposed in the stamped portion and the sharpened cutting edge being disposed in the machined portion; and the plurality of relief portions being machined into the plurality of waves radially inward of the sharpened cutting edge.

17. The disk blade of claim 10, wherein each of the plurality of relief portions comprises a first machined edge, a second machined edge, and a third machined edge, the first machined edge being substantially straight and disposed nearest the sharpened cutting edge, and the second and third machined edges being partially curved at a location at which the second and third machined edges converge.

18. A tillage disk blade for use in a tillage operation, comprising:
- a disk body including an outer peripheral edge and an opening defined in a central portion of the body through which a rotation axis passes, the body being disposed in a first plane which is perpendicular to the rotation axis;
- a plurality of waves formed in a predefined pattern in the outer peripheral edge of the disk body;
- a plurality of teeth defined in the outer peripheral edge, where each of the plurality of teeth comprises a sharpened edge substantially disposed within a second plane, the second plane being parallel to the first plane and perpendicular to the rotation axis; and
- a plurality of relief portions formed in the plurality of waves of the disk body, wherein each of the plurality of relief portions is located radially outward on the plurality of waves and radially inward of the plurality of teeth and no portion of the plurality of relief portions extends to the outer peripheral edge.

19. The disk blade of claim 18, wherein the plurality of waves and the plurality of teeth are symmetrically formed in the outer peripheral edge.

20. The disk blade of claim 18, further comprising a plurality of notches formed in the outer peripheral edge of the disk blade, each of the plurality of notches formed inbetween at least two of the plurality of teeth;
- wherein, each of the plurality of relief portions is disposed radially inward of one of the plurality of notches; and
- wherein, each of the plurality of relief portions is machined at an angle relative to the first plane.

* * * * *